No. 788,375. PATENTED APR. 25, 1905.
W. C. QUINLEN.
STONE CUTTING APPARATUS.
APPLICATION FILED NOV. 11, 1903.

2 SHEETS—SHEET 2.

Witnesses
F. W. Riley
Herbert D. Lawson

Inventor
W. C. Quinlen
By Victor J. Evans
Attorney

No. 788,375.  
Patented April 25, 1905.

UNITED STATES PATENT OFFICE.

WILLIAM C. QUINLEN, OF BARRE, VERMONT.

STONE-CUTTING APPARATUS.

SPECIFICATION forming part of Letters Patent No. 788,375, dated April 25, 1905.

Application filed November 11, 1903. Serial No. 180,753.

*To all whom it may concern:*

Be it known that I, WILLIAM C. QUINLEN, a citizen of the United States, residing at Barre, in the county of Washington and State of Vermont, have invented new and useful Improvements in Stone-Cutting Apparatus, of which the following is a specification.

My invention has relation to improvements in stone-cutting machines; and the apparatus consists of means whereby the edges of the stone may be cut partially or their entire lengths, as will be hereinafter described, and particularly pointed out in the claim.

Figure 1:
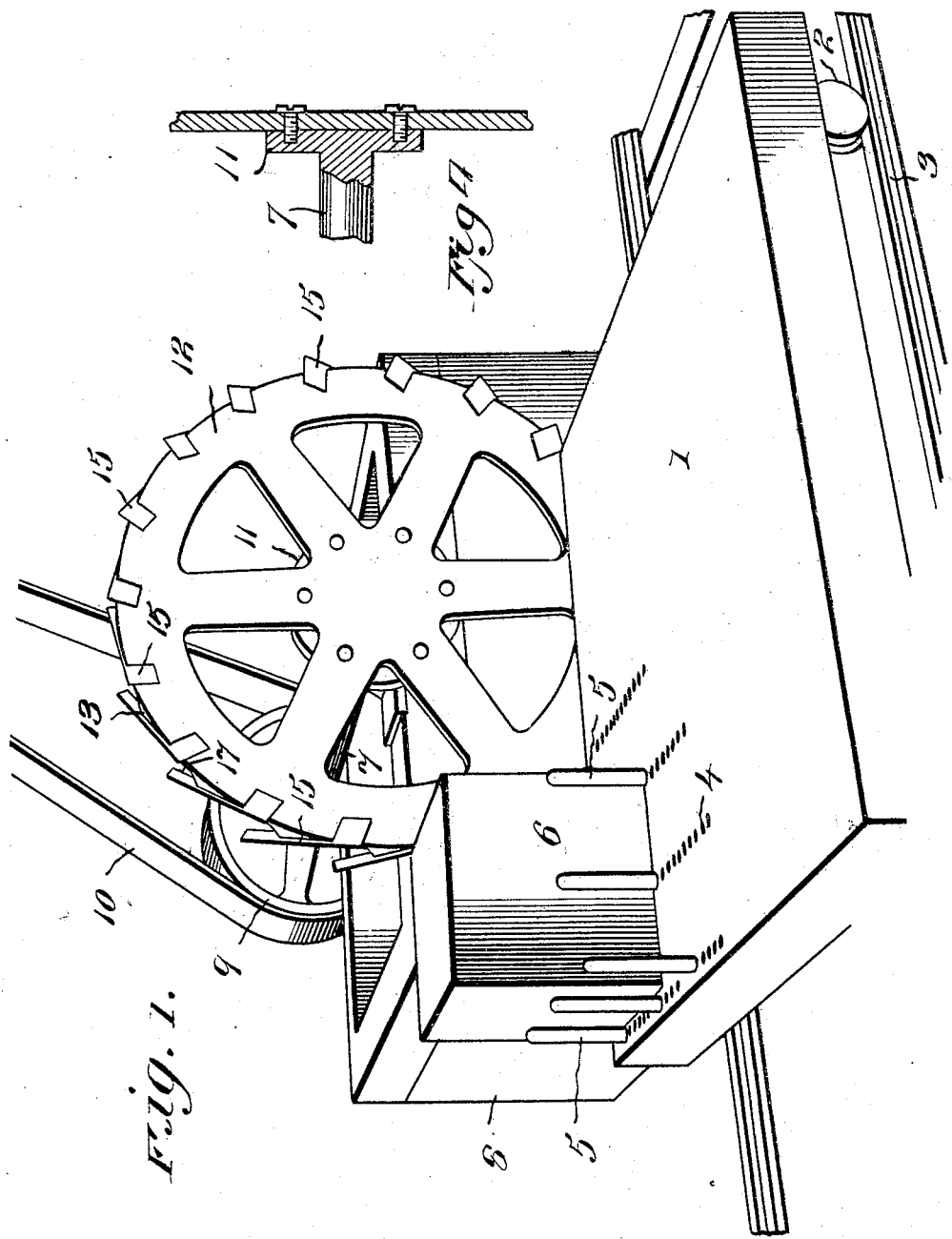
Figure 2:
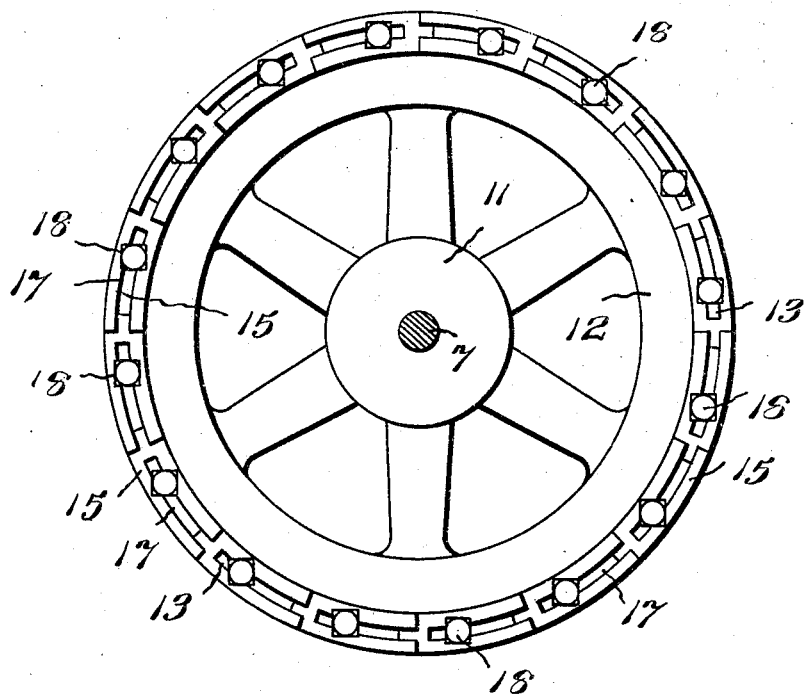
Figure 3:
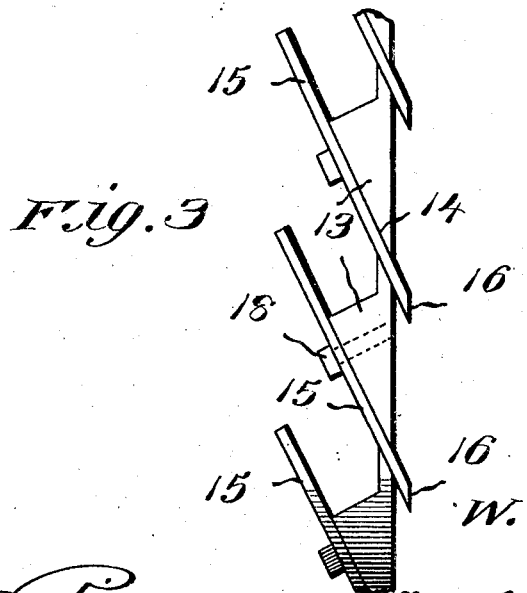

In the accompanying drawings, Figure 1 is a perspective view of the apparatus. Fig. 2 is a rear elevation of the wheel. Fig. 3 is a plan view of a portion of said wheel, and Fig. 4 is a detail view illustrating the manner of detachably securing the wheel to the disk.

Referring to the figures by numerals of reference, 1 is a carriage having wheels 2, which are mounted on rails 3, provided therefor. Parallel series of apertures 4 are formed in the top of the carriage for the reception of holding-pins 5. These pins are adapted to be placed about a block of stone 6 in such a manner as to hold the same securely against lateral or longitudinal movement away from the cutting apparatus. A shaft 7 is journaled upon a frame 8, located at one side of the rails 3, and at one end of this shaft is a pulley 9, adapted to be driven by a belt 10, and at the other end of the shaft is secured a disk 11, which is bolted or otherwise secured to the inner face of the center of a wheel 12. The periphery of this wheel has laterally-extending triangular projections 13 upon the rear face thereof, and these projections are spaced apart equal distances. One face of each extension alines with an inclined slot 14, formed within the periphery of the wheel, and each slot is adapted to receive a blade 15, the cutting edge 16 of which projects beyond the front face of the wheel 12. The other end of the blade is slotted longitudinally, as shown at 17, and arranged within this slot is a bolt 18, which projects into the adjoining extension 13 and serves to clamp the blade in adjusted position. The blades 15 are all inclined in the same direction, and the cutting edges thereof are adapted to project into the path of the block 6.

The block of stone to be cut is placed upon the carriage at a suitable point, and the pins 5 are placed within apertures 4, so as to hold said block securely against longitudinal or lateral movement away from the cutting apparatus. Wheel 12 is then rotated and the carriage 1 moved toward it. The outer corners of the revolving blades 15 are thus brought successively into contact with the adjoining face of this stone and quickly cut the same. When the blades become worn, they can be readily removed by detaching the bolts 18, and after they have been sharpened they can be reinserted into the slots 14 and adjusted to proper positions therein. It will of course be understood that this machine is especially constructed for cutting soft stone.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

A stone-cutting apparatus comprising a carriage, a wheel revolubly mounted thereon and having on one of its side faces adjacent to its periphery a series of surrounding spaced-apart bearing-blocks, the bearing-faces of which are diagonally inclined downwardly and each terminating at their inner ends in a cutting-blade opening formed in the wheel and having its opposite side faces inclined to correspond with the inclined face of the block, a series of straight cutting-blades having inclined cutting ends arranged in line with the body of the blade, said blades being mounted on the blocks and having longitudinal slots therein, means passing through the slots and secured to the blocks which serve to give the blades an endwise-adjustable movement on the blocks so as to permit of the cutting edges of the blades passing through said openings and projecting beyond the periphery of the wheel, substantially as specified.

In testimony whereof I affix my signature in presence of two witnesses.

WILLIAM C. QUINLEN.

Witnesses:
 WM. WISHART,
 FRANK F. CAVE.